United States Patent [19]
Taylor

[11] 3,817,502
[45] June 18, 1974

[54] APPARATUS AND METHOD FOR REFINING MOLTEN IRON

[75] Inventor: Richard P. Taylor, Chillicothe, Ohio

[73] Assignee: The Mead Corporation, Dayton, Ohio

[22] Filed: Sept. 21, 1972

[21] Appl. No.: 290,956

[52] U.S. Cl............. 266/34 R, 75/52, 75/60, 266/37, 264/9
[51] Int. Cl............................................. C21c 7/00
[58] Field of Search ......... 266/34 R, 35, 37; 425/6, 425/7; 75/60, 59, 52, 51, 45; 264/5, 6, 9, 10, 13, 14

[56] References Cited
UNITED STATES PATENTS

| | | | |
|---|---|---|---|
| 2,510,574 | 6/1950 | Greenhalgh | 264/9 |
| 2,915,380 | 12/1959 | Hilty | 266/34 R |
| 3,554,521 | 1/1971 | Rhydderch | 266/35 |
| 3,558,120 | 1/1971 | Whettan | 266/34 R |
| 3,579,721 | 5/1971 | Kaltenbach | 264/9 |
| 3,591,159 | 7/1971 | Messing | 266/34 R |
| 3,598,571 | 8/1971 | Moffatt | 75/60 |

Primary Examiner—Gerald A. Dost
Attorney, Agent, or Firm—Biebel, French & Bugg

[57] ABSTRACT

There is disclosed a spray steel making process wherein streams of molten pig iron are subjected to a constant frequency vibration. This vibration causes the streams to break up into uniformly sized and regularly spaced drops which then are refined in the presence of oxygen and a shower of lime particles. A fast and yet precisely controlled refining reaction is produced because of the small but uniform drops which fall through the reaction chamber. Apparatus is also disclosed for automatic adjustment of the stimulation frequency and for electrical charging of the drops so formed.

6 Claims, 3 Drawing Figures

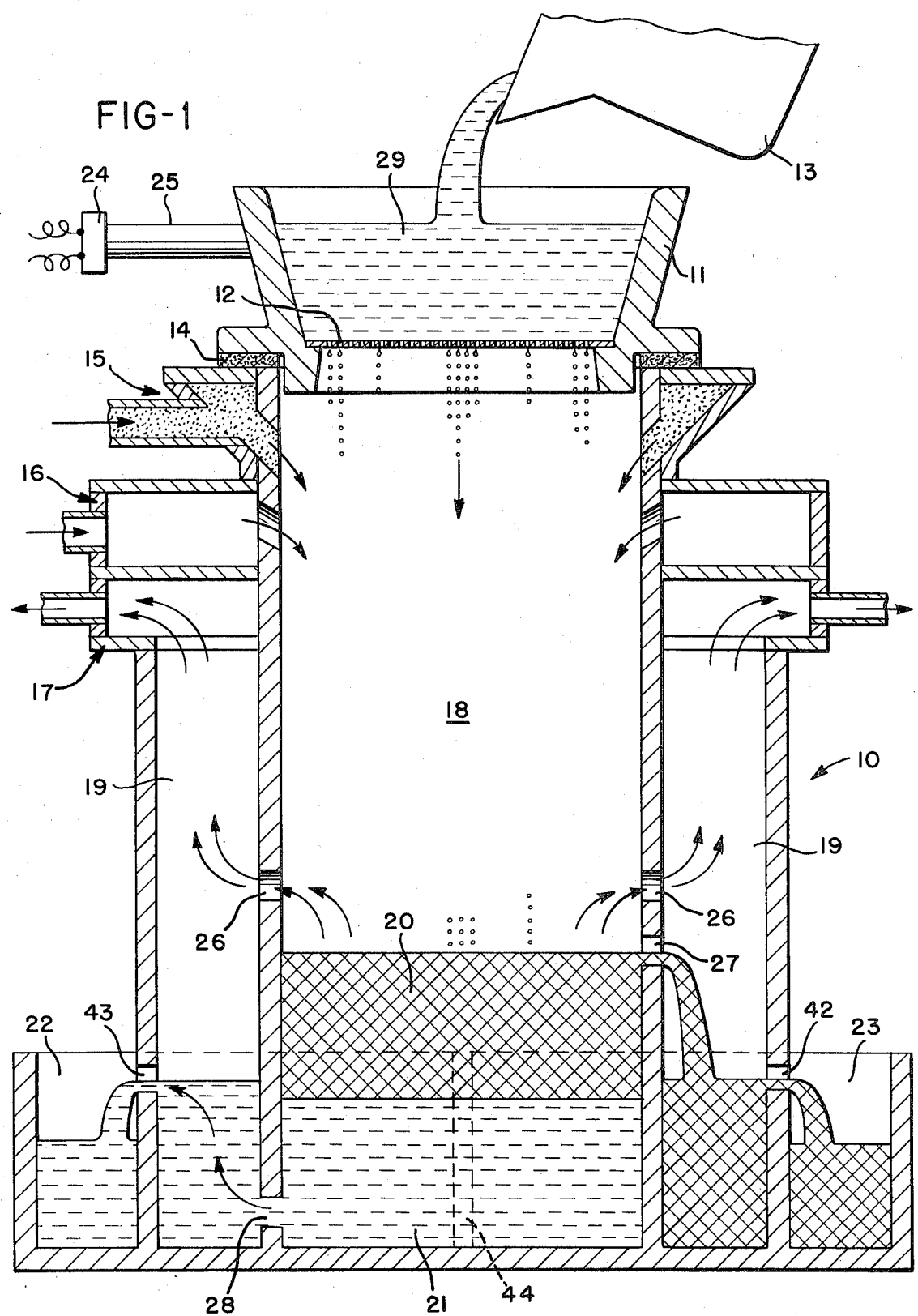

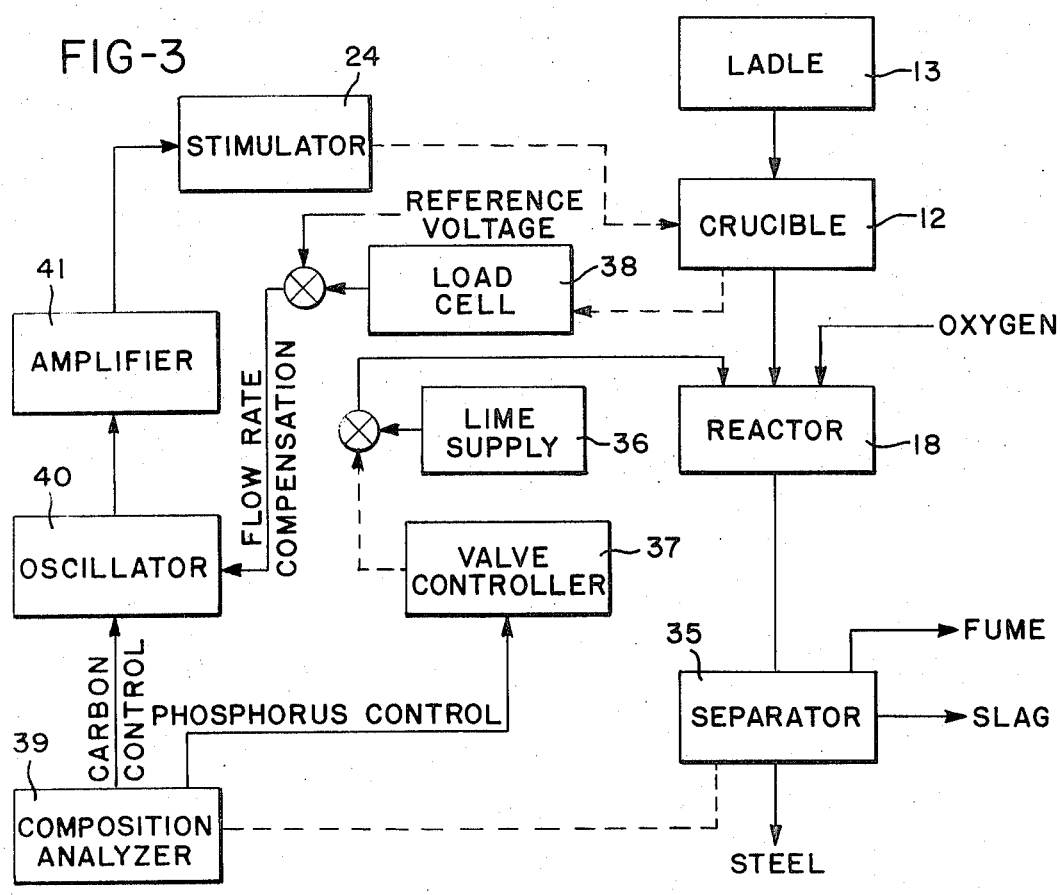
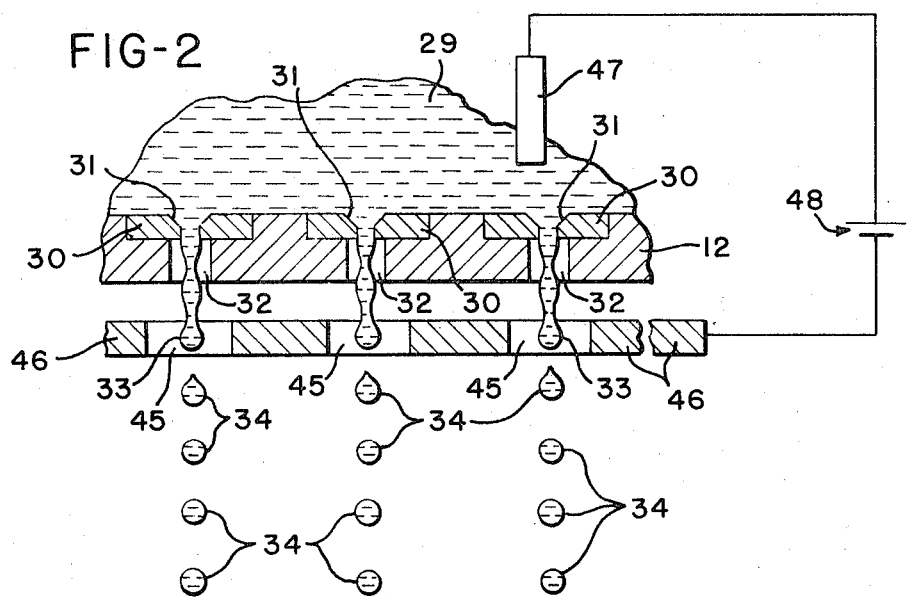

APPARATUS AND METHOD FOR REFINING MOLTEN IRON

BACKGROUND OF THE INVENTION

This invention relates to the field of molten pig iron refining. More particularly it relates to spray steel making wherein molten pig iron is transformed into small drops and thereafter refined in a controlled atmosphere to produce steel having a fairly well regulated carbon content.

Crude iron as it is manufactured in a modern blast furnace contains a number of impurities. A typical pig iron composition might be carbon 4 percent, silicon 1 percent, phosphorus 0.3 percent, manganese 1 percent, and sulfur 0.04 percent. Iron of such a composition is refined in a vessel with oxygen and a basic slag. The oxygen removes the carbon, silicon, and manganese by oxidation, and the slag removes phosphorus and sulfur, and controls the degree of oxidation in the iron itself.

A traditional method of refining pig iron has been the open hearth process in which regeneratively heated air is blown over the surface of a vessel containing molten iron with an upper layer of slag. The vessel resembles a hearth being a rectangular shallow basin, to provide as much surface area as possible for the reaction of the air with the iron. The reaction rate is limited by the diffusion of the air through the upper layer of the slag. Modern, open-hearth furnaces have a capacity of from 100 to 200 tons, and the average time of an open hearth refining operation is between 8 and 9 hours. Although the reactions in the open hearth are exothermic, the reactions are slow and do not provide enough heat to maintain the temperature. Therefore coke, oven gas, or fuel oil is used to supplement the heat recovered from the waste gases.

Another popular refining process is the basic oxygen process which in recent years has been replacing the open hearth process. The basic oxygen furnace consists of a cylindrical vessel with a truncated top, which is charged with molten iron and up to 30 percent of scrap. A water-cooled oxygen inlet tube called a lance is lowered into the furnace and the flow of oxygen is started at the surface of the liquid bath. Slag forming fluxes are added and the molten charge reacts vigorously with the oxygen blasts. Stirring is accomplished by the velocity of oxygen impinging on the surface and the vigorous reaction. Because of the use of pure oxygen and the much smaller surface-to-volume configuration of the basic oxygen furnace, no external source of heat is required to maintain the reaction. The reaction is much faster than the open hearth, occurring at a high temperature and requiring about 20 minutes for completion.

A third process which is somewhat related to the basic oxygen process is the Bessemer process, in which air is blown through the melt via a series of inlet ports (tuyeres) let into the vessel bottom. Here excellent mixing of the air in the molten charge is accomplished and reaction times are as short as 8 minutes. The Bessemer process was superceded by the open hearth process early in the 20th century because of the lack of suitable basic refractories for the area around the air inlet tuyeres. Suitable acid refractories were available but they could be used only with low phosphorus ores since this element cannot be removed with an acid slag.

Each of the above described steel making processes are batch processes. Because of the variabilities of charge and difficulty of control of conditions in a large batch, it is difficult to arrive at a steel of precisely predictable composition. Consequently, steels made by these processes are usually refined until the carbon content thereof has been almost completely removed. When carbon or manganese containing steels are desired, these elements are fed back into the melt by addition of ferro-alloys.

A continuous steel making process in which the refining conditions can be continuously adjusted to control the composition of the steel being produced would be much more desirable. The spray steel making process has been developed to fulfill this requirement, and a number of such processes are currently available. Typical examples of spray steel making processes are disclosed in Hilty U.S. Pat. No. 2,915,380, Churcher U.S. Pat. No. 3,058,734, Goss et al, U.S. Pat. No. 3,251,680, and Rhydderch U.S. Pat. No. 3,542,351. In each case a charge of molten iron is broken into iron droplets which are thereafter refined by an oxygen atmosphere. In other spray steel making processes such as those disclosed in Ramacciotti U.S. Pat. No. 3,528,799 and Rhydderch U.S. Pat. No. 3,554,521 the falling drops of molten iron are subjected to the action of a slag forming material as well as an oxidizing gas. Since the surface-to-volume ratio of small droplets in a spray steel making process is very much greater than occurs in a batch reaction, a much more rapid refining reaction occurs.

The very high reaction rate of the spray steel process has two advantages. First the size of the reactor for a given tonnage throughput is quite small. Secondly, the heat generation rate from the oxidation impurities is quite large so that heat losses are not a cause for concern. Furthermore, the refining reaction in the spray steel process takes place at relatively high temperatures which is favorable for the removal of carbon and manganese impurities at relatively low iron oxidation rate. Relatively large amounts of scrap iron may also be utilized in the spray steel process.

A major disadvantage with prior art spray steel processes has been a non-uniform reaction due to variation in the sizes of the molten iron drops. Ordinarily spray steel systems are designed to produce drops having some fairly ideal nominal size, but in practice the drop sizes are distributed over a fairly wide range. As a consequence the larger drops with their relatively small surface-to-volume ratio have been inadequately refined whereas the smaller drops with their large surface-to-volume ratio have been refined to the point where the iron therein has become completely oxidized. Thus when conditions have been adjusted to produce adequate refining of the large drops, there has resulted a large quantity of iron oxide which has mixed with the slag and been lost.

SUMMARY OF THE INVENTION

This invention eliminates the disadvantages of prior art spray steel making processes by providing apparatus and method whereby molten pig iron drops of precisely uniformly sized may be introduced in a reaction chamber. This is accomplished by passing the iron through an array of orifices and vibrating the orifices to stimulate drop production as desired. For any fluid jet there is a frequency at which drops are naturally formed. If a regularly timed vibration near that frequency is applied to the stream, it will stimulate formation of uniformly sized and regularly spaced drops at this frequency even though other vibrations of a random nature are present.

Drop stimulation as above described has been well known for many years and was discussed by Lord Rayleigh as early as 1877. However, so far as is known, this phenomenon has never been applied to steel making. It has been applied to fields such as recording as shown for instances in Sweet et al, U.S. Pat. No. 3,373,437 and pellet making as shown for instance in Greenhalgh U.S. Pat. No. 2,510,574. In each case the frequency of the vibration to which the jet is preferably subjected is one whose wavelength on the jet is about 4.5 times the diameter of the stream. The frequency to produce this critical disturbance was shown by Lord Rayleigh to be:

$$f = V/L = V/4.5D = \sqrt{C_v\, 2\, g\, H/4.5D} \qquad (1)$$

where
v = velocity of jet
D = diameter of stream or orifice
L = distance between disturbances
H = liquid head or pressure
$C_v$ = velocity coefficient The vibration may readily be produced by a number of ways. One simple method is to place an electromechanical vibrator or a magnetostrictive transducer in contact with the end of a refractory rod which itself is in contact with the crucible. Such a transducer can be designed to operate over a range of frequencies suitable for the size of orifice and flow rates of molten iron. For example, a 1.5 foot hydrostatic head of molten iron will produce a flow velocity of about 9 feet per second through an orifice of 0.030 inch diameter. The optimum vibration frequency for droplet stimulation will then be about 400 Hertz. Other orifice sizes may be used in the range of from about 0.001 to 1.00 inch. The optimum vibration frequency will then vary accordingly, but in any case the drop stimulation may be accomplished at other frequencies provided sufficient stimulation power is available.

It is therefore seen that in accordance with the practice of this invention a spray steel making process is accurately controlled by regulating the size of the molten iron drops. However, the means by which the drop size is regulated also enable controlled increasing or decreasing of drop size. Thus in further accord with the practice of this invention, the operation of a spray steel making process may be monitored by continuous or periodic observation and the drop size changed automatically in response thereto. The observed operating parameters may be either input iron flow rate or output steel composition, and the control action may be a variation in the frequency of drop stimulation.

BRIEF DESCRIPTION OF THE DRAWINGS

FIG. 1 is a drawing of a reaction chamber made in accordance with the practice of this invention;

FIG. 2 is an enlarged cross sectional view of drop forming and charging apparatus; and FIG. 3 is a block diagram of an iron refining process employing the invention.

DESCRIPTION OF THE PREFERRED EMBODIMENTS

A preferred embodiment of the apparatus of this invention is illustrated in FIG. 1 wherein a crucible 11 is shown resting on top of a reactor 10 with a sealing ring 14 therebetween. A supply of molten pig iron 29 is supplied to crucible 11 as by a ladle 13. The pig iron leaves crucible 11 via a series of orifices in a perforated plate 12. A magnetostrictive vibrator 24 transmits regular frequency vibrations to crucible 11 as by rod 25, thereby causing the exiting pig iron to be broken up into trains of uniformly sized and regularly spaced drops. The drops of molten iron fall through a reaction chamber 18 where they are acted upon by oxygen and by lime. Oxygen for this purpose is supplied via oxygen supply ring 16. Lime enters chamber 18 from line supply ring 15 as an annular curtain of powder. The lime powder is carried to lime supply ring 15 by compressed oxygen.

As the molten iron drops fall through reactor chamber 18 they are refined under the influence of lime and the oxygen to produce steel slag and waste gas or fume all as is well known in the art. The temperature of the reaction is about 2,000° centigrade. The waste gas leaves reactor 10 via outlet ports 26 and gas output manifold 17. The slag 20 floats on top of the steel 21 and leaves the reactor chamber 18 via port 27 to collect at the lower end of outer chamber 19. The slag thereafter exits via port 42 and is collected by container 23. The steel 21 enters outer chamber 19 via port 28 and thereafter exits the reactor via port 43 for collection by container 22. A partition 44 separates the slag from the steel at the lower end of outer chamber 19.

Perforated plate 12 may be made of calcia stabilized zirconia, aluminum oxide, or other suitable refractory material. Alternatively, plate 12 may be made primarily of such material but be provided with a series of orifice plate inserts 30 as shown in FIG. 2. Plates 30 may be made of single crystal or polycrystalline beryllium oxide as taught for instance by Rakestraw U.S. Pat. No. 3,584,678. Each plate 31 has an orifice which is made by first machine counter-sinking the plate and thereafter drilling and polishing the orifice. As further shown in FIG. 2, molten iron 29 passes through orifices 31 in insert plate 30 and thereafter passes through larger orifices 32 in perforated plate 12. The iron leaves plate 30 as a series of continuous filaments. These filaments 33 are stimulated by vibrations from stimulator 24 to break up into uniformly sized and regularly spaced drops 34. Drops 34 may then pass through apertures 45 in a charging plate 46 for purposes to be subsequently explained.

A refining apparatus in accordance with this invention may be designed to accommodate a wide range of production rates. By way of example, a reactor producing steel at a rate of 10 tons per hour may have about two hundred fifty orifices 31 each with a diameter of about 30 mils. For such a reactor the total area of plate 12 should be about 540 square inches and the iron should be maintained in crucible 11 with a head of about 1.5 feet. The optimum stimulation frequency for such an arrangement is about 400 Hertz. Under such conditions the drops will have a diameter of about 150 mils and will travel through reaction chamber 18 at a speed of about 9 feet per second. Satisfactory refining may be achieved by providing space in chamber 18 for a drop flight of about 15 feet.

The uniform droplets of molten iron produced in accordance with the practice of this invention all have the same surface-to-volume ratio. Since all droplets see successively the same oxidation environment, the degree of refining of impurities is precisely the same for each droplet. This allows very precise control of final carbon, manganese, and silicon content of the resulting steel by making very small changes in oxidation flow rate. It also means that oxygen flow conditions can be set to precisely optimize the impurity removal with minimum iron oxidation. This results in a substantial improvement in steel yield over prior art spray steel processes using non-uniform droplets.

The steel making process of this invention lends itself readily to automatic control. Thus if it is desired to increase the rate of reaction taking place in chamber 18, the droplets size may (within limits) be decreased. Alternatively, the reaction rate may be slowed down by increasing the droplet size. In either case the size variation may be accomplished by increasing or decreasing the frequency of an electrical driving signal applied to stimulator 24. Changes in stimulation frequency may also be made to correct process disturbances introduced by variations of iron flow rate into crucible 11. Thus, when the flow rate out of ladle 13 begins to increase the level of iron in crucible 11 raises, increasing the fluid pressure and the rate of iron flow through orifices 31. This increasing flow rate tends to increase the size of droplets 34 and thus to decrease the refining reaction rate. Correction thereto may be accomplished by increasing the drop stimulation frequency.

FIG. 3 presents a general block diagram of an automatic steel making control system operating as above described. Thus load cell 38 mounted at the edge support of crucible 11 monitors crucible weight which is a measure of fluid pressure at orifices 31. The output from load cell 38 is compared with a reference voltage to generate an error signal for flow rate compensation. This error signal is fed to oscillator 40 for adjustment of the frequency thereof. Oscillator 40 is a driver for stimulator 24 and may be any convenient variable frequency device. For instance, oscillator 40 may comprise a tuning capacitor driven by a synchro-receiver. The above mentioned error signal then is fed to the synchro-receiver for adjusting the frequency of the signal transmitted from oscillator 40 to amplifier 41.

The frequency of oscillator 40 may also be controlled manually or automatically in response to measurements made by a composition analyzer 39. Composition analyzer 39 may comprise a spectroscope for analysis of the carbon and phosphorus content of the steel being produced by the process. Variations in phosphorus content may be corrected by applying an error signal to valve controller 37 which controls the rate of lime supply from a supply vessel 36 to reactor 18. Carbon content correction is accomplished by changing the drop stimulation frequency as above described. Carbon content may also be controlled by controlling the oxygen input rate to reactor 18.

As described above, this invention provides streams of uniformly sized and regularly spaced iron drops for accurately controlled refining. However, due to aerodynamic non-uniformity in some apparatus configurations, some drops may slow up relative to others. If reaction chamber 18 is sufficiently long, the slow drops may be captured by trailing drops travelling at a slightly higher speed. This coalescing process may be repeated several times as each capture produces a larger drop with increased aerodynamic drag. The result is a stream of non-uniform drops and a non-uniform refining reaction.

This problem can be averted by generating the drops in the presence of an electrical field. In such a case the drops will each carry a small electrostatic charge. Then as the drops approach each other, electrostatic repulsion forces will inhibit coalescing. The electrostatic charge may be sufficiently large to cause repulsion on close approach, but not sufficient to exert appreciable force between drops equally spaced within a stream. Thus streams of uniformly sized and regularly spaced drops will be maintained, with each drop remaining within the wake influence of the previous drops.

FIG. 2 illustrates apparatus for accomplishing the above mentioned drop charging. As shown therein fluid filaments 33 pass through apertures 45 in charging plate 46 before breaking up into drops 34. Charging plate 46 is placed near the point of drop formation. An electrical field is created between the walls of apertures 45 and the surface of streams 33 by means of a probe 47 and a source of electrical potential 48. Probe 47 is connected to one side of potential source 48 and charging plate 46 is connected to the other side.

It will be appreciated that the molten iron is a relatively conductive fluid. Probe 47 and charging plate 46 are also made of a conductive material, preferably a material able to withstand relatively high temperatures such as, for instance, tungsten. Thus the tips of filaments 33 are placed at one electrical potential and the walls of the apertures 45 at another. Consequently a layer of electrical charge is induced at the tips of filaments 33, and this charge is carried away by the drops.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. Apparatus for refining molten pig iron comprising:

a. a crucible for reception and dispensing of said pig iron, said crucible being provided at the base thereof with a plurality of orifices for dispensing said pig iron in a set of continuous streams,
   b. means for vibrating said orifices and causing said streams to break up into trains of uniformly sized and regularly spaced drops,
   c. means defining a reaction chamber surrounding said trains of drops,
   d. means for introducing an oxidizing gas into said chamber whereby the pig iron defining the drops in said trains is subjected to a uniform refining reaction, and
   e. means for catching said drops and collecting the pig iron so refined.

2. Apparatus according to claim 1 further comprising means for measuring the pressure at which molten pig iron is delivered to said orifices and means responsive thereto for adjusting the operating frequency of said vibrating means.

3. Apparatus according to claim 1 further comprising an outer chamber surrounding said reaction chamber, said outer chamber communicating with said reaction chamber at three different levels for removal and separation of the steel, slag, and gaseous waste products which collect in the reaction chamber.

4. Apparatus according to claim 1 further comprising means for applying an electrical charge to the drops so formed.

5. Apparatus according to claim 1 further comprising means for introducing a shower of lime particles into said reaction chamber.

6. Apparatus for manufacturing steel comprising:

a. a reaction chamber,
b. means for introducing molten pig iron into said chamber in the form of a series of jet filaments,
c. means for vibrating said jets at a frequency near their natural frequency and causing said jets to break up into a series of trains of uniformly sized and regularly spaced drops,
d. means for introducing an oxidizing gas into said reaction chamber, and
e. means for catching said drops after refining thereof and separating the steel from the waste products therein.

* * * * *